United States Patent
Narula et al.

(10) Patent No.: US 11,671,362 B2
(45) Date of Patent: Jun. 6, 2023

(54) MANAGING DATA TRAFFIC FOR TWO SIMULTANEOUS VPN CONNECTIONS WITH A VPN CLIENT

(71) Applicant: MICROSOFT TECHNOLOGY LICENSING, LLC, Redmond, WA (US)

(72) Inventors: Deepak Narula, Redmond, WA (US); Shivakumar Thangapandi, Redmond, WA (US); Vikrant Arora, Redmond, WA (US); Abhishek Gupta, Redmond, WA (US); Amit Kumar Nanda, Sammamish, WA (US); Akshat Kale, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/319,643

(22) Filed: May 13, 2021

(65) Prior Publication Data
US 2022/0368631 A1    Nov. 17, 2022

(51) Int. Cl.
*H04L 45/74* (2022.01)
*H04L 61/5007* (2022.01)
(Continued)

(52) U.S. Cl.
CPC .......... *H04L 45/74* (2013.01); *H04L 12/4641* (2013.01); *H04L 45/22* (2013.01); *H04L 61/5007* (2022.05)

(58) Field of Classification Search
None
See application file for complete search history.

(56) References Cited

U.S. PATENT DOCUMENTS

| 1,140,132 A | 5/1915 | Dorsey |
|---|---|---|
| 7,689,722 B1 | 3/2010 | Timms et al. |

(Continued)

FOREIGN PATENT DOCUMENTS

CN    110191031 A    8/2019

OTHER PUBLICATIONS

"International Search Report and Written Opinion Issued in PCT Application No. PCT/US22/024158", dated Jun. 30, 2022, 20 Pages.

(Continued)

*Primary Examiner* — Hong Shao
(74) *Attorney, Agent, or Firm* — Newport IP, LLC; Jacob P. Rohwer

(57) ABSTRACT

The techniques described herein enable the establishment of two simultaneous virtual private network (VPN) connections between a VPN gateway and a VPN client. The system is configured to update a routing table advertised to network resources when a VPN server instance fails and/or is taken offline. When a first VPN server instance fails and/or is taken offline, the first VPN server instance releases a claim of ownership on its range of IP addresses. After this release occurs, the second VPN server instance is configured to claim ownership of the range of IP addresses that used to be owned by the first VPN server instance. This updated claim of ownership is captured in an updated routing table that can then be advertised to the network resources. Consequently, the network resources use this updated routing table to correctly determine which VPN server instance to send data intended for the VPN client.

19 Claims, 13 Drawing Sheets

(51) Int. Cl.
*H04L 12/46* (2006.01)
*H04L 45/00* (2022.01)

(56) References Cited

U.S. PATENT DOCUMENTS

| | | | |
|---|---|---|---|
| 10,601,779 | B1 | 3/2020 | Matthews et al. |
| 2006/0002384 | A1 | 1/2006 | Chen |
| 2009/0144817 | A1 | 6/2009 | Kumar et al. |
| 2011/0142053 | A1 | 6/2011 | Van et al. |
| 2015/0007272 | A1 | 1/2015 | Zou |
| 2015/0043350 | A1 | 2/2015 | Basilier |
| 2016/0261504 | A1 | 9/2016 | Sung et al. |
| 2017/0126664 | A1* | 5/2017 | Khandelwal ........ H04L 63/0272 |
| 2018/0041421 | A1 | 2/2018 | Lapidous et al. |
| 2019/0327112 | A1 | 10/2019 | Nandoori et al. |
| 2019/0327312 | A1 | 10/2019 | Gupta et al. |
| 2020/0236048 | A1 | 7/2020 | Branch et al. |
| 2020/0329048 | A1* | 10/2020 | Bhattacharya ...... H04L 63/0272 |
| 2020/0336409 | A1 | 10/2020 | Branch |
| 2022/0368675 | A1 | 11/2022 | Narula et al. |

OTHER PUBLICATIONS

"International Search Report and Written Opinion Issued in PCT Application No. PCT/US22/024170", dated Jul. 13, 2022, 12 Pages.
"VpnChannel.ReplaceAndAssociateTransport(Object, Object) Method", Retrieved from: https://docs.microsoft.com/en-us/uwp/api/windows.networking.vpn.vpnchannel.replaceandassociatetransport?view=winrt-19041, Retrieved Date: Mar. 25, 2021, 2 Pages.
"Non Final Office Action Issued in U.S. Appl. No. 17/319,601", dated Sep. 1, 2022, 19 Pages.
U.S. Appl. No. 17/319,601, filed May 13, 2021.
"Notice of Allowance Issued in U.S. Appl. No. 17/319,601", dated Mar. 1, 2023, 12 Pages.

* cited by examiner

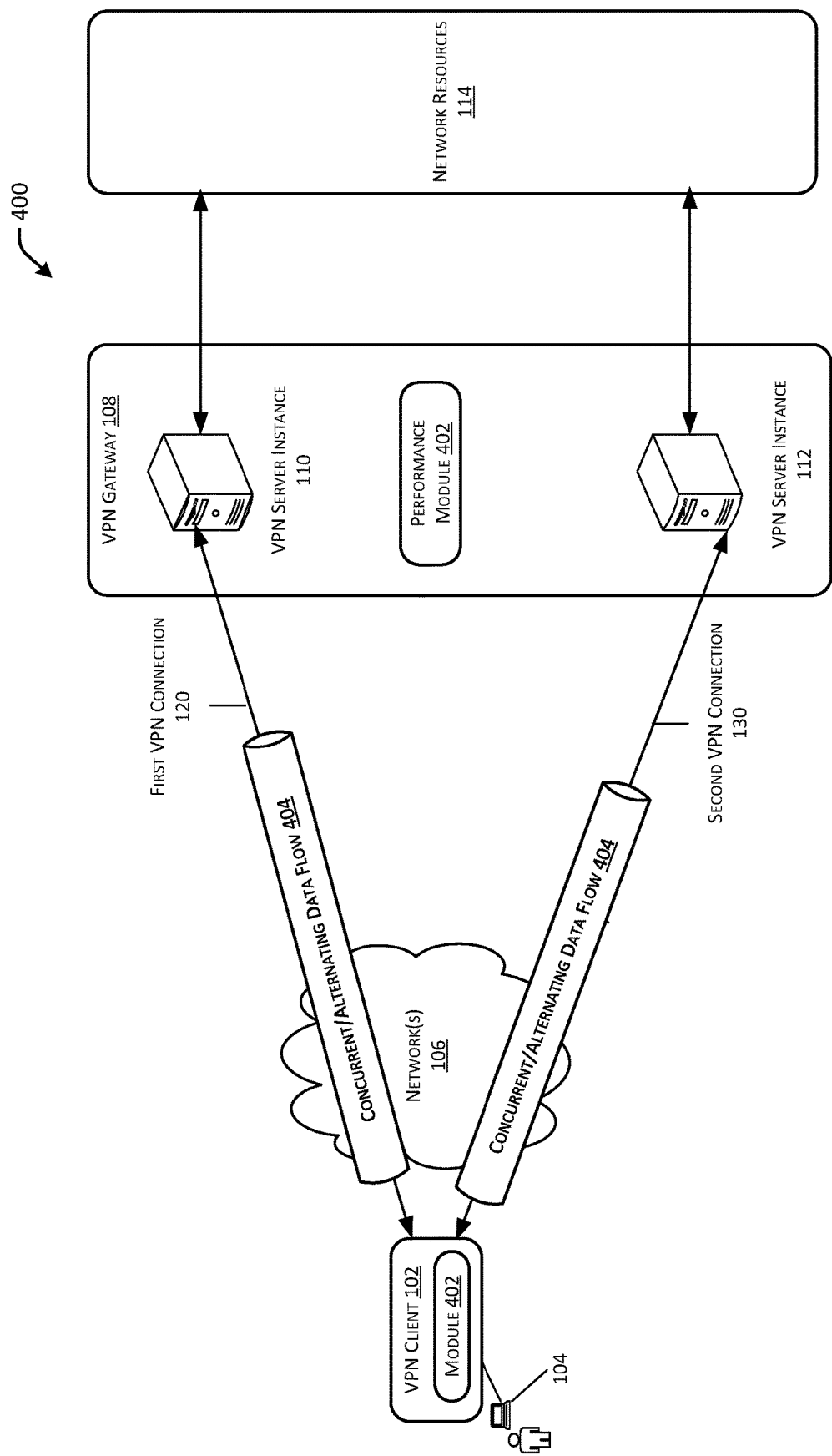

MANAGING DATA TRAFFIC FOR TWO SIMULTANEOUS VPN CONNECTIONS WITH A VPN CLIENT

BACKGROUND

A virtual private network (VPN) implements various technologies that exchange data, typically Internet Protocol data, via another network so that users can remotely access network resources in a secure manner. In other words, these network resources may otherwise be inaccessible via public Internet. VPNs are frequently used in the information technology sector to provide secure access to resources for users that are not physically connected to an organization's network. In many situations, these users are telecommuting workers or employees.

Conventionally, a VPN client can access network resources via a VPN gateway. A VPN gateway is an intermediate system tasked with sending data traffic between the network resources and a remote location (e.g., a home network, an on-premises network, etc.) over the public Internet. Consequently, the VPN client typically operates on a remote device (e.g., an on-premises device, a home device, a work device, etc.) and the VPN gateway is configured by a service (e.g., cloud) provider in the network to enable access to the network resources (e.g., virtual networks, virtual machines, servers, etc.), which are configured behind the VPN gateway. A VPN gateway typically consists of multiple VPN server instances configured behind a traffic manager. The traffic manager is associated with a single DNS name, and is configured to implement load balancing for the multiple VPN server instances. A VPN server instance is typically responsible for decrypting incoming data and passing the data off to resources on the network side (e.g., applications executing via a virtual network and/or on a virtual machine). The VPN server instance may also encrypt outgoing data and send the data to the VPN client.

To establish a VPN connection, a VPN client sends a request to the traffic manager. The traffic manager implements load balancing and routes the request to one of the multiple VPN server instances in the VPN gateway. Consequently, the VPN client and the VPN server instance to which the initial request was routed can establish a VPN connection so that data can be exchanged between a remote location and a network location in a secure manner. The VPN client is configured to use a single Transmission Control Protocol (TCP) socket to establish the VPN connection with the VPN server instance. This TCP socket is used as the under-lying connection oriented transport layer. Accordingly, the VPN control plane and the encrypted data plane communication happens over this TCP socket.

The use of one TCP socket and one VPN connection can cause some problems. For instance, when a VPN server instance is taken offline for maintenance, all the active VPN connections to that VPN server instance are dropped, effectively breaking active traffic flows between a VPN client and the VPN server instance. As described above, however, the VPN gateway includes multiple VPN server instances. These VPN server instances may be referred to as redundant VPN server instances such that when a VPN client experiences a planned or unplanned interruption event with a first VPN server instance (e.g., the first VPN server instance is taken offline for maintenance), the TCP socket on the VPN client used to implement the established VPN connection is configured to reset and establish another VPN connection with a backup VPN server instance in the VPN gateway. This reset may be part of an automatic "failover" or "switchover" process that occurs after the planned or unplanned interruption event.

While this helps a user continue a VPN session, the experience is not ideal because there is typically a delay in restoring connectivity. More specifically, if the interruption in service is a planned interruption, this delay can last about fifteen to thirty seconds. If the interruption is unplanned, this delay can last about ninety seconds. It is with respect to these and other considerations the disclosure made herein is presented.

SUMMARY

The techniques disclosed herein enable the establishment of two simultaneous virtual private network (VPN) connections for a VPN client. A first VPN connection can be established with a first VPN server instance of a VPN gateway, and a second VPN connection can be established with a second VPN server instance of the VPN gateway. To establish two simultaneous VPN connections, a VPN client described herein is configured to create and/or use two Transmission Control Protocol (TCP) sockets. A TCP socket is used for exchanging data between two devices. Accordingly, a TCP socket can include an Internet Protocol (IP) address, as well as a port used to exchange the data. Applications and/or operating system components that take part in data communications use the TCP socket to send and/or receive data.

In various examples described herein, the first VPN connection may be referred to as a primary VPN connection and the second VPN connection may be referred to as a dormant VPN connection that serves as a backup. The VPN client can be configured to exchange data with the first VPN server instance over the primary VPN connection. However, if this primary VPN connection is interrupted and a disconnect occurs (e.g., the first VPN server instance fails and/or is taken offline for maintenance), the VPN client can immediately switch to using the second VPN connection to avoid a service interruption. Stated alternatively, the VPN client switches the dormant VPN connection from a dormant state to a primary state when the primary VPN connection is interrupted, so that the data can continue to be exchanged. This immediate switch provides a seamless VPN gateway experience that is not susceptible to service interruptions.

To ensure this seamless VPN gateway experience, the VPN gateway must assure that the VPN client does not establish two VPN connections with the same VPN server instance. Given the conventional approach to the load balancing implemented by a traffic manager, there is a possibility that two separate requests sent to the traffic manager can be load balanced to land on the same VPN server instance. To avoid this scenario, each of the VPN server instances that comprise the VPN gateway are made aware of the other VPN server instances' IP addresses. Stated alternatively, a VPN server instance in the VPN gateway can share its IP address with other VPN server instances in the VPN gateway. Then, the first VPN server instance, with which the VPN client establishes a first VPN connection via the traffic manager, can provide a known IP address for a second VPN server instance to the VPN client.

The VPN client receives the known IP address and sends a request directly to the second VPN server instance (e.g., a "direct dial" request), without going through the traffic manager via the use of a "load balanced" request. Previously, a VPN server instance is not configured to receive direct dial requests. Rather, conventional VPN server instances are only configured to handle load balanced requests received from the traffic manager. Accordingly, a configuration of the VPN server instances described herein is altered so they can receive direct dial requests. This ensures that a second VPN connection for a VPN client is established with a different VPN server instance than the one with which the first VPN connection was established. The VPN gateway can identify, via an initial load balanced request, that the VPN client supports a second, dormant VPN connection, and thus, the VPN gateway can instruct the first VPN server instance to respond to the initial load balanced request with the known IP address of the second VPN server instance.

To ensure the disclosed techniques do not provide issues for an operating system of a computing device on which the VPN client is operating, the VPN client is configured to hide the actual external data transports via two concurrent TCP sockets from the operating system. In other words, the operating system of the computing device on which the VPN client is operating is agnostic to the changes occurring within the VPN client. In one example, the VPN client can hide the actual data transports via two TCP sockets from the operating system by internally using a connection-less transport User Datagram Protocol (UDP) socket to associate a VPN interface to the operating system via the TCP/IP stack. It then appears, to the operating system, that there is only one active connection even though the VPN client has created, and is maintaining, multiple VPN connections at the same time. Consequently, the VPN interface to the operating system is not bound to a single TCP socket.

Once both TCP sockets are created by the VPN client, the VPN client can call into the operating system platform via a start application programming interface (API) to create the VPN interface. Then, the VPN client can multiplex, or stitch together, a data flow between an application executing on the computing device and a corresponding application executing in the network (e.g., cloud). Part of this data flow may be split such that it is received over the first VPN connection and the second VPN connection. The multiplexing pieces the split data flow back together so that it is whole when passed on to the application executing on the computing device via the VPN interface and the operating system. In various examples and depending on a type of operating system, the VPN interface may be referred to as an Internal Adapter, a Tunnel Interface, etc.

As part of the establishment of the first VPN connection, the first VPN server instance is configured to assign a static IP address to the VPN client. To ensure continuity in communications over two VPN connections, the VPN client requests that the second VPN server instance use the same assigned static IP address for the second VPN connection. This may be referred to as a "static IP" request which is sent from the VPN client to the second VPN server instance. Accordingly, the second VPN server instance is configured to honor this static IP address and omit implementing its own IP address allocation phase for the VPN client.

Once both VPN connections are up and running, the VPN client can be configured to exchange data via the primary VPN connection. This may be implemented in accordance with a policy that designates one of the two VPN connections as a primary VPN connection and the other of the two VPN connections as a backup, dormant VPN connection. In this scenario and in accordance with the policy, if the dormant VPN connection disconnects, the VPN client is configured to attempt to reestablish the dormant VPN connection until reconnection succeeds, while continuing to use the primary VPN connection. However, if the primary VPN connection disconnects, the VPN client is configured to switch the dormant VPN connection from a dormant state to a primary state (e.g., upgrade the backup TCP socket) and use the new primary VPN connection for data transmission while attempting to reestablish the old primary VPN connection. Upon reestablishment, the VPN client can switch data transmission back to the original primary VPN connection (e.g., the first VPN connection).

As described above, in various embodiments, the first and second VPN connections can be used as primary and dormant VPN connections to seamlessly deal with interruptions. In alternative embodiments, the first and second VPN connections can be used to split (e.g., spray) a data flow based on performance parameters such as latency. Accordingly, the VPN client and the VPN gateway can be configured to monitor the performance of the data transmission on one or both of the VPN connections. Based on the monitored performance, part of a data flow can be transmitted via the first VPN connection and part of the data flow can be transmitted via the second VPN connection.

In one example, a first part of the data flow can be transmitted via the first VPN connection and a second part of the same data flow can be transmitted via the second VPN connection at the same time (e.g., a split data flow with simultaneous transmission). In another example, that data flow can switch back and forth between the first and second VPN connections based on the monitored performance, such that at any given time the data flow is only being transmitted via one of the two VPN connections (e.g., a split data flow with alternating data transmission).

Ultimately, this enables a VPN client to balance the load on different VPN connections and different VPN server instances when performance begins to suffer. For instance, the performance monitoring may indicate that the first VPN connection is slow and is experiencing high latency. Accordingly, at least part of the data communications being implemented on the first VPN connection can move to the second VPN connection to balance the load.

Some additional changes in the VPN gateway can be implemented to accommodate two simultaneous VPN connections with a single VPN client. As described above, multiple VPN server instances of the VPN gateway are configured to use a static IP address for the VPN client. This can potentially create a problem with respect to reverse data flow traffic, or data being sent from an application executing in the network (e.g., cloud) to an application executing on the computing device.

A routing table is used by network resources (e.g., virtual networks and/or virtual machines configured to execute an application in the cloud) that are configured behind the VPN gateway. The routing table provides guidance with regard to how the network resources are to route data being sent back to the VPN client. For instance, the VPN gateway allocates a pool of IP addresses which are to be assigned by the VPN server instances to different VPN clients. This pool of IP addresses is divided amongst the VPN server instances in the VPN gateway. Consequently, a first VPN server instance has a first range of IP addresses from the pool which are intended to be assigned to VPN clients with which the first VPN server instance establishes VPN connections. Similarly, a second VPN server instance has a second range of IP addresses from the pool, which does not overlap with the first range of IP addresses, and which are intended to be assigned to VPN clients with which the second VPN server instance establishes VPN connections. The allocation of a range of IP addresses from the pool may be referred to as ownership, e.g., a VPN server instance claims ownership of the range of IP addresses.

This pool division, or the IP address ranges allocated to different VPN server instances, is reflected in the routing table that is "advertised" to the network resources. In other words, the network resources know which VPN server instance to send back data to the VPN client using this routing table. Since there is no overlap in the ranges of IP addresses, the network resources are configured, via the use of the routing table, to only respond to one VPN server instance at a given time.

Via the techniques described herein, two different VPN server instances are using the same static IP address for a single VPN client. This static IP address is assigned to the VPN client by the first VPN server instance. That is, the first VPN server instance selects the static IP address out of the range of IP addresses allocated to it from the pool. Consequently, in this scenario, the routing table essentially instructs the network resources to send data back to the VPN client through the first VPN server instance. This instruction is correct and appropriate as long as the first VPN server instance has not experienced an interruption.

However, a problem may occur when the first VPN connection between the VPN client and the first VPN server instance is interrupted and the second VPN connection between the VPN client and the second VPN server instance is used. In one example, the first VPN connection may be interrupted if the first VPN server instance fails and/or is taken offline (e.g., is "down"). In this scenario, the routing table indicates that the static IP address for the VPN client is included in the first range of IP addresses. Accordingly, the network resources are configured to send data back to a VPN server instance that is not operational. This may occur even though the data is received by the network resources via the second VPN server instance.

To implement proper data flows, the techniques are configured to update the routing table when a VPN server instance fails and/or is taken offline. When a first VPN server instance fails and/or is taken offline, the first VPN server instance releases its claim of ownership on its range of IP addresses. Further, the VPN gateway can be made aware of the status of the first VPN server instance. After this release occurs, the second VPN server instance is configured to claim ownership of the range of IP addresses that used to be owned by the first VPN server instance. In various examples, the first VPN server instance can instruct the second VPN server instance to take ownership of the range of IP addresses.

This updated claim of ownership is captured in an updated routing table that can then be advertised to the network resources. Consequently, the network resources use this updated routing table to correctly determine that the reverse data flow, for the static IP address originally allocated via the first VPN server instance, should currently be sent back to the VPN client through the second VPN server instance, at least for a temporary period of time while the first VPN server instance is unavailable. During this period of time, the second VPN server instance is advertised as the next hop for both the first and the second ranges of IP addresses. Then when first VPN server instance is fixed and/or comes back online, it can reclaim its ownership on the range of IP addresses and the routing table is updated again.

The techniques disclosed herein provide a number of features that improve existing computing devices. For instance, data computing resources such as processor cycles, memory, network bandwidth, and power, do not have to be used to establish a new VPN connection when an interruption to the existing VPN connection occurs. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 illustrates a scenario where the first and second VPN connections from FIGS. 1 and 2 can be used to split a data flow based on performance parameters such as latency.

DETAILED DESCRIPTION

Described herein is a system that enables the establishment of two simultaneous virtual private network (VPN) connections for a VPN client operating on a remote computing device. The VPN client can establish first VPN connection with a first VPN server instance of a VPN gateway and a second VPN connection with a second VPN server instance of the VPN gateway. To establish two simultaneous VPN connections, the VPN client is configured to create and/or use two Transmission Control Protocol (TCP) sockets. In one example, a first VPN connection can be a primary VPN connection and a second VPN connection can be a dormant VPN connection configured as a backup in case of a service interruption with the first VPN connection. In another example, a data flow can be split across the first and second VPN connections.

To implement proper data flows between applications executing on client devices and applications executing in the network (e.g., cloud), the system is configured to update a routing table advertised to network resources when a VPN server instance fails and/or is taken offline. That is, when a first VPN server instance fails and/or is taken offline, the first VPN server instance releases a claim of ownership on its range of IP addresses, which is reflected in the routing table. After this release occurs, the second VPN server instance is configured to claim ownership of the range of IP addresses that used to be owned by the first VPN server instance. This updated claim of ownership is captured in an updated routing table that can then be advertised to the network resources. Consequently, the network resources use this updated routing table to correctly determine which VPN server instance a reverse data flow should be sent through.

Figure 1:
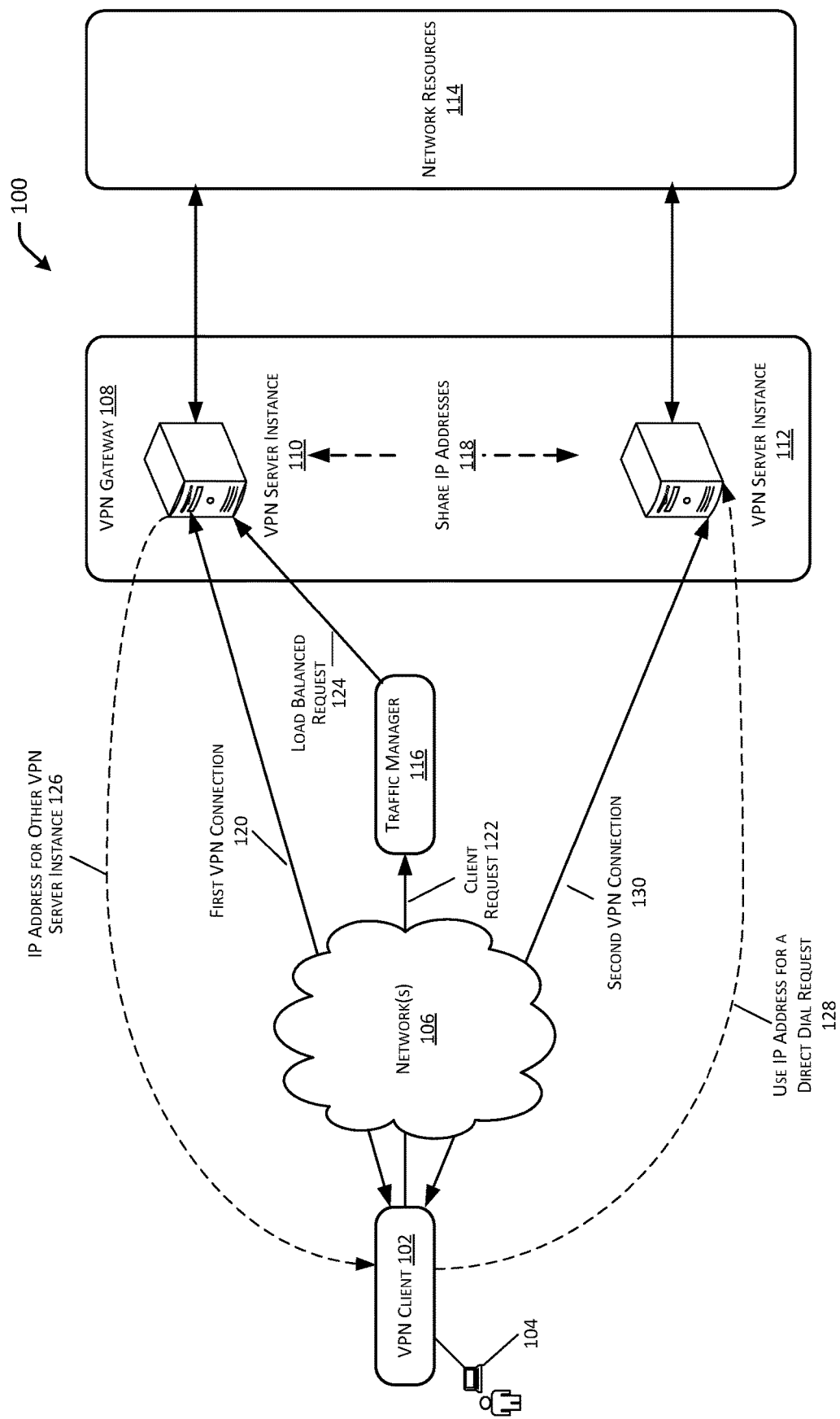
FIG. 1 illustrates an example environment in which a VPN client operating on a remote computing device can establish two VPN connections, over various network(s), with a VPN gateway.

FIG. 1 illustrates an example environment 100 in which a VPN client 102 operating on a remote computing device 104 can establish two VPN connections, over various network(s) 106, with a VPN gateway 108. As shown and for ease of illustration, the VPN gateway 108 can include a first VPN server instance 110 and a second VPN server instance 112 that are part of a group of VPN server instances. However, the VPN gateway 108 can also include more than two VPN server instances that are part of a group of VPN server instances.

As described above, the VPN gateway 108 is an intermediate system tasked with sending data traffic between network resources 114 (e.g., virtual machines, virtual networks, servers, etc.) configured behind the VPN gateway 108, and the remote computing device 104. A traffic manager 116, associated with a single DNS name, is configured to implement load balancing for the first and second VPN server instances 110, 112.

To ensure a seamless VPN experience, the VPN gateway 108 must assure that the VPN client 102 does not establish two VPN connections with the same VPN server instance. Given the conventional approach to the load balancing implemented by a traffic manager 116, there is a possibility that two separate requests sent to the traffic manager 116 can be load balanced to the same VPN server instance. To avoid this scenario, each of the VPN server instances 110, 112 that comprise the VPN gateway 108 are made aware of the other VPN server instances' IP addresses. Stated alternatively, each VPN server instance in the VPN gateway 108 can share its IP address with other VPN server instances in the VPN gateway 108, as referenced by 118.

To establish a first VPN connection 120, the VPN client sends an initial request 122 to the traffic manager 116. This initial request 122 is sent by associating a DNS identifier with an IP address of the traffic manager 116. The initial request 122 is transformed, by the traffic manager, into a load-balanced request 124 that is routed to one of the VPN server instances in the VPN gateway 108. In the example of FIG. 1, the load-balanced request 124 lands on VPN server instance 110. Then, the VPN server instance 110 can provide a known IP address for another VPN server instance 112 to the VPN client 102, as referenced by 126.

The VPN client 102 receives the known IP address and sends a request directly to the other VPN server instance 112 (e.g., a "direct dial" request), without going through the traffic manager 116, as referenced by 128. As discussed above, previously, a VPN server instance is not configured to receive direct dial requests. Rather, conventional VPN server instances are only configured to handle load balanced requests received from a traffic manager. Accordingly, a configuration of the VPN server instances 110, 112 is altered so they can receive direct dial requests, such as the one illustrated by 128. This ensures that a second VPN connection 130 for the VPN client 102 can be established with a different VPN server instance 112 than the one with which the first VPN connection 120 was established.

In various examples, the VPN gateway 108 is configured to identify, via the load-balanced request 124, that the VPN client 102 supports a second VPN connection 130. Thus, the VPN gateway 108 can instruct the VPN server instance 110 to respond to the load-balanced request 124 with the known IP address of the other VPN server instance 112.

Figure 2:
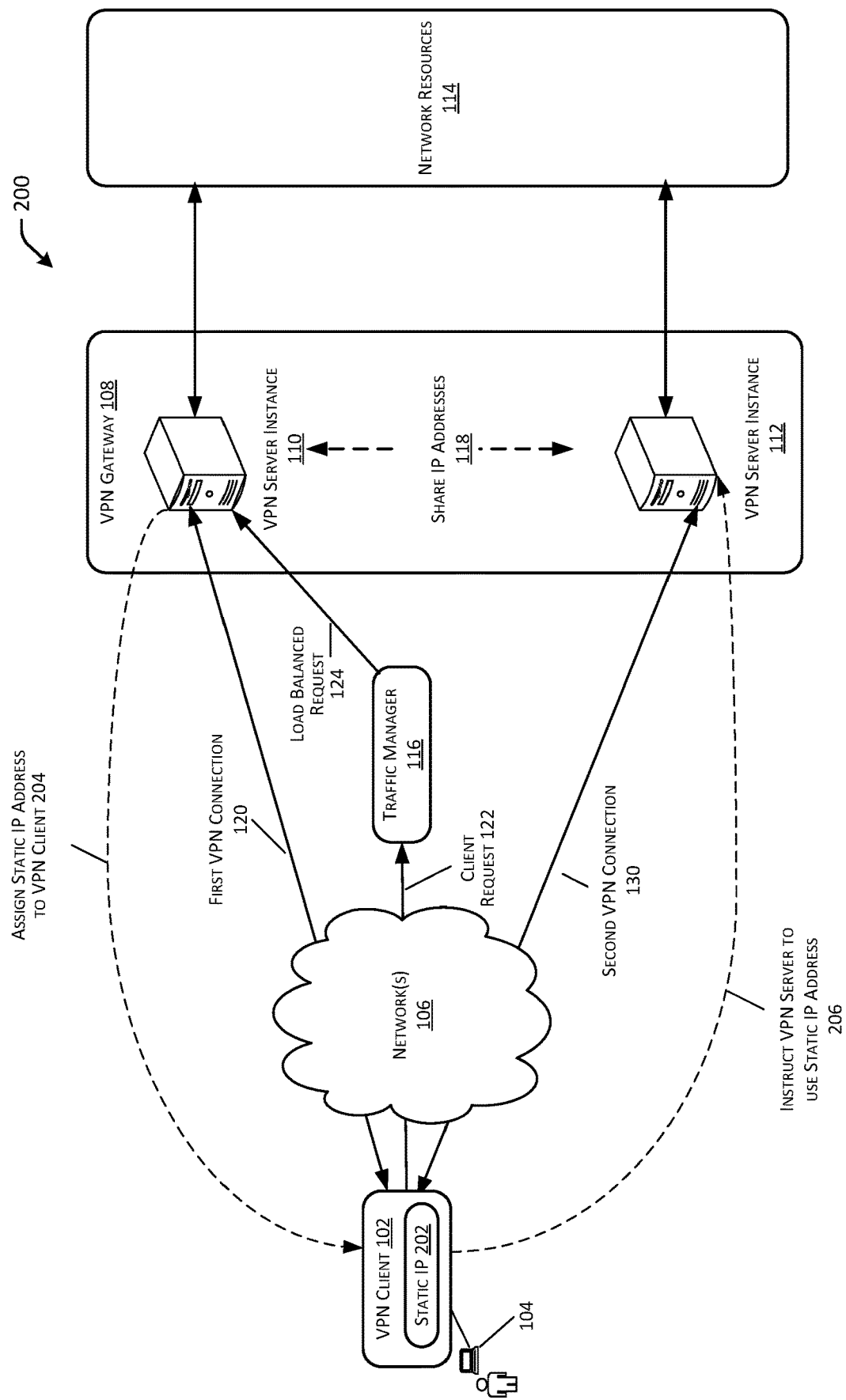
FIG. 2 illustrates another example environment in which the VPN client from FIG. 1 is assigned a static IP address.

FIG. 2 illustrates another example environment 200 in which the VPN client 102 from FIG. 1 is assigned a static IP address 202. As part of the establishment of the first VPN connection 120, the VPN server instance 110 is configured to implement an IP address allocation phase for the VPN client 102. Based on the allocation phase, the VPN server instance 110 assigns the static IP address 202 to the VPN client 102, as referenced by 204. To ensure continuity in communications over two different VPN connections 120, 130, the VPN client 102, in turn, instructs the VPN server instance 112 to use the same assigned static IP address 202 for the second VPN connection 130, as referenced by 206. This may be referred to as a "static IP" request which is sent directly from the VPN client 102 to the VPN server instance 112. Accordingly, the second VPN server instance 112 is configured to honor this static IP address 202 and omit implementing its own IP address allocation phase for the VPN client 102. Data traffic that is to be sent from the VPN client 102 to the VPN server instances 110, 112 originates from the static IP address 202. However, the VPN server instances 110, 112 will use a separate underlay IP address to communicate with, or send data packets to, the VPN client 102.

Figure 3A:
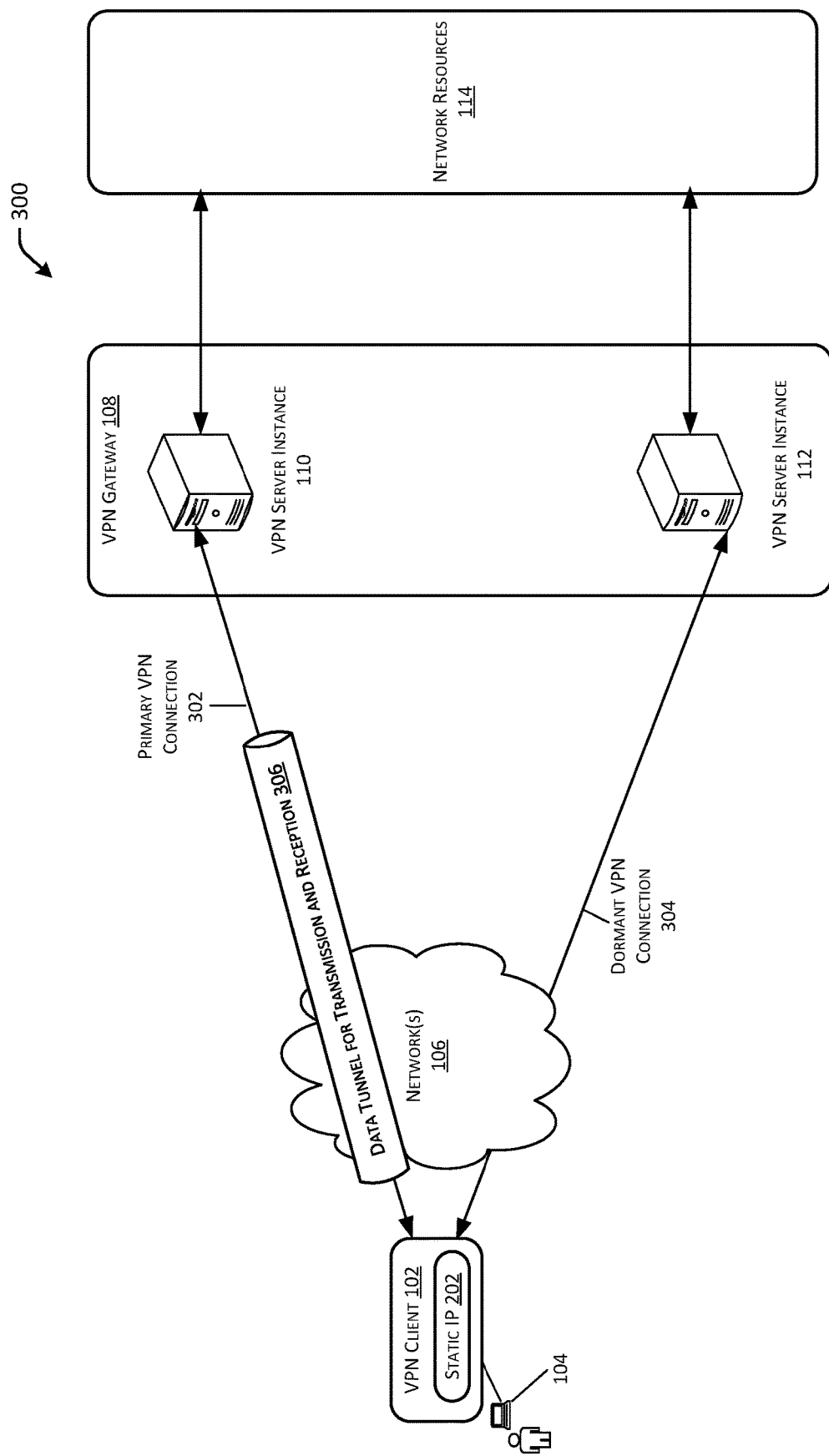
FIG. 3A illustrates an example scenario where the first VPN connection from FIGS. 1 and 2 is used by the VPN client as a primary VPN connection and where the second VPN connection from FIGS. 1 and 2 is used by the VPN client as a dormant VPN connection.

FIG. 3A illustrates an example scenario 300 where the first VPN connection 120 from FIGS. 1 and 2 is used by the VPN client 102 as a primary VPN connection 302 and where the second VPN connection 130 from FIGS. 1 and 2 is used by the VPN client 102 as a dormant VPN connection 304. The dormant VPN connection 304 can serve as a backup VPN connection in case of an interruption to the primary VPN connection 302.

Figure 3B:
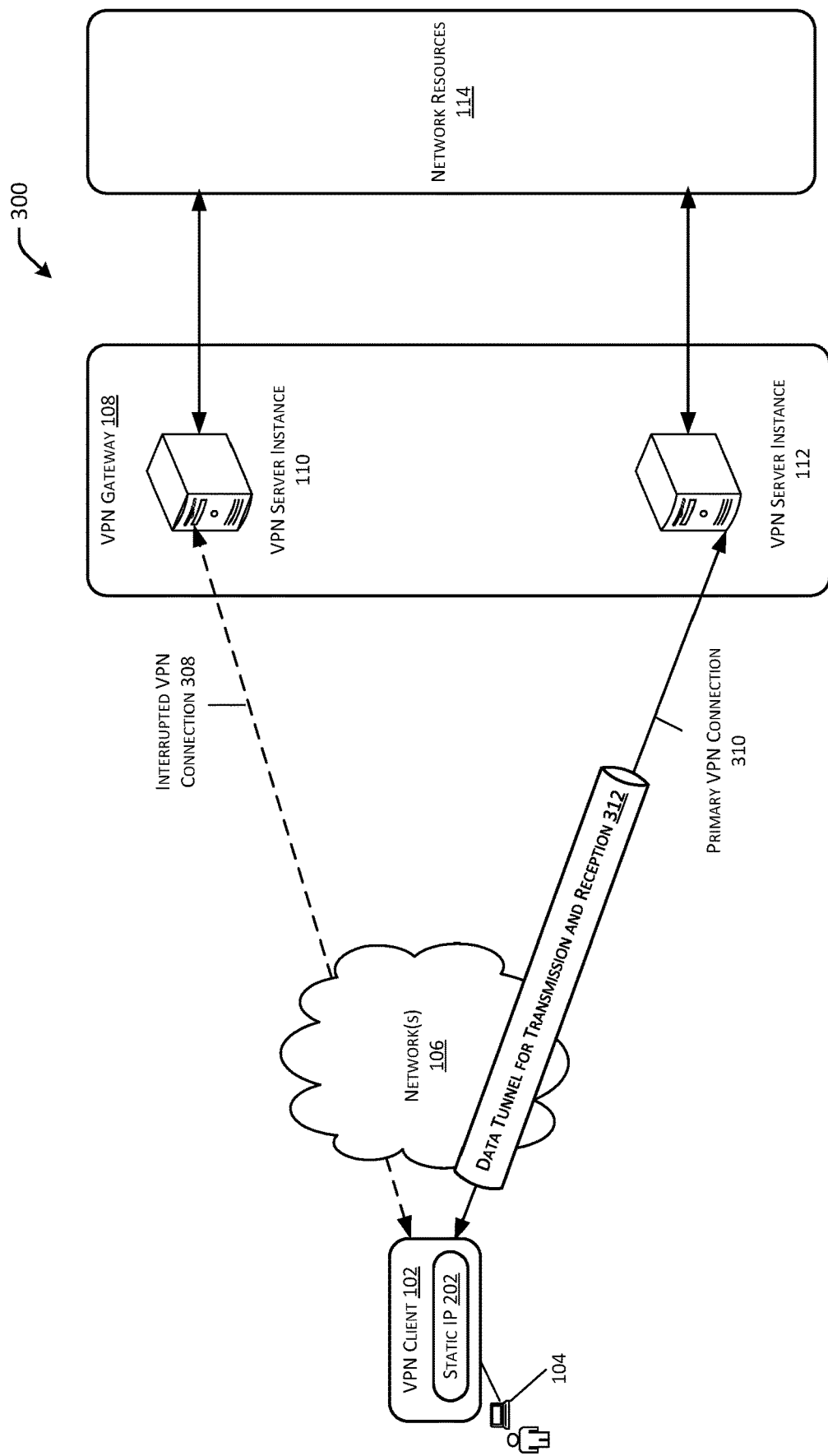
FIG. 3B illustrates a scenario where the primary VPN connection from FIG. 3A experiences an interruption and the dormant VPN connection from FIG. 3A is switched to a primary state.

Accordingly, the VPN client 102 can implement a policy that designates one of multiple VPN connections as a primary VPN connection 302, and another one of the multiple VPN connections as a dormant VPN connection 304. That is, the VPN client 102 can be configured to exchange data (e.g., transmit and receive data) with the VPN server instance 110 over the primary VPN connection 302 (as illustrated by data tunnel 306). However, as shown in FIG. 3B, if the primary VPN connection is interrupted 308 and a disconnect occurs (e.g., the VPN server instance 110 fails or is taken offline for maintenance), the VPN client 102 can immediately switch to using the dormant VPN connection to avoid a service interruption. Stated alternatively, the VPN client 102 switches the dormant VPN connection 304 in FIG. 3A from a dormant state to a primary state 310, as shown in FIG. 3B, when the initial or previous primary VPN connection is interrupted 308. In this way, the data can continue to be exchanged (as illustrated by data tunnel 312). This immediate switch provides a seamless VPN gateway experience that is not susceptible to service interruptions.

In additional examples, the first and second VPN connections 120, 130 from FIGS. 1 and 2 can be used to split a data flow between an application executing on the remote computing device 104 and an application executed by network resources 114 based on performance parameters (e.g., latency). FIG. 4 illustrates an example scenario 400 that captures this. As shown, the VPN client 102 and/or the VPN gateway 108 can include a performance module 402 configured to monitor the performance of the data transmission on the first and/or second VPN connections 120, 130. More specifically, the performance module 402 can determine when the performance parameters indicate that one of the first VPN connection 120 or the second VPN connection 130 is performing better than the other of the first VPN connection 120 or the second VPN connection 130.

Based on the monitored performance, part of a data flow 404 can be transmitted via the first VPN connection 120 and part of the data flow 404 can be transmitted via the second VPN connection 130. In one example, the VPN client 102 can decide to transmit a first part of the data flow via the first VPN connection 120 and to transmit a second part of the same data flow via the second VPN connection 130 in a concurrent manner. In another example, the VPN client 102 can decide that the data flow transmission can switch back and forth (e.g., alternate) between the first and second VPN connections 120, 130 based on the monitored performance. Ultimately, this management at the data flow level enables the VPN client 102 and/or the VPN gateway 108 to balance the load on different VPN connections 120, 130 and different VPN server instances 110, 112 when performance begins to suffer. For instance, the performance module 402 may indicate that the first VPN connection 120 is slow and is experiencing high latency. Accordingly, at least part of the data communications being implemented on the first VPN connection 120, or that would have been implemented on the first VPN connection 120, can move to the second VPN connection 130 to balance the load.

Figure 5:
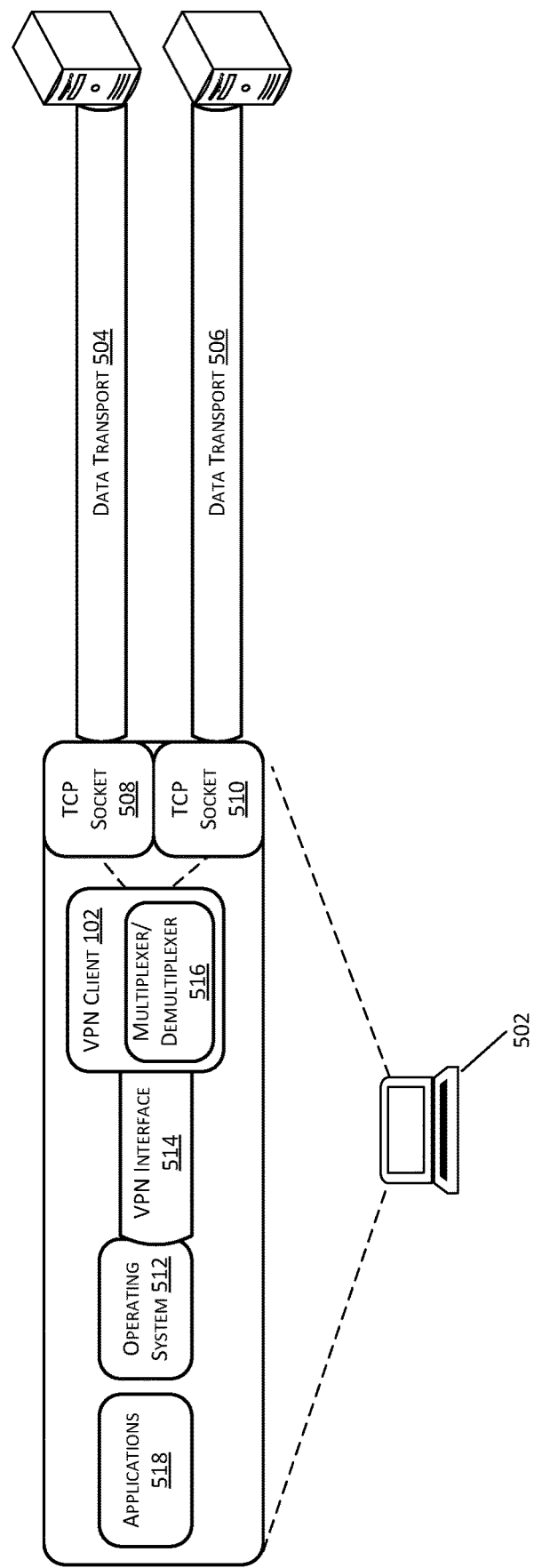
FIG. 5 illustrates components of a computing device that are configured to ensure the disclosed techniques do not provide issues for an operating system of a computing device on which the VPN client is operating.

FIG. 5 illustrates components of a computing device 502 (e.g., remote computing device 104) that are configured to ensure the disclosed techniques do not provide issues for an operating system of a computing device on which the VPN client is operating. The VPN client 102 operating on the computing device 502 is configured to hide the actual external data transports 504, 506 via two TCP sockets 508, 510 from an operating system 512. In other words, the operating system 512 of the computing device 502 on which the VPN client 102 is configured is agnostic to the changes occurring within the VPN client 102 (e.g., the use of two TCP sockets to implement two VPN connections simultaneously).

In one example, the VPN client 102 can hide the actual data transports 504, 506 via two TCP sockets 508, 510 from the operating system 512 by internally using a connectionless transport User Datagram Protocol (UDP) socket to associate a VPN interface 514 to the operating system 512 via the TCP/IP stack. Once both TCP sockets 508, 510 are created by the VPN client 102, the VPN client 102 can call into the operating system 512 via a start application programming interface (API) to create the VPN interface 514. It then appears, to the operating system 512, that there is only one active connection even though the VPN client 102 has created, and is maintaining, multiple VPN connections at the same time. Consequently, the VPN interface 514 to the operating system 514 is not bound to a single TCP socket. The two TCP sockets 508, 510 created by the VPN client 102 use the same IP address, but different ports.

The VPN client 102 can include a multiplexer/demultiplexer 516 to multiplex, or stitch together, a data flow received over a first VPN connection (e.g., data transport 504) and a second VPN connection (e.g., data transport 506), as well as demultiplex the data flow back to separate parts. Part of this data flow may be split such that it is received over the first VPN connection and the second VPN connection (as described above with respect to FIGS. 3A-3B or FIG. 4). The multiplexing pieces the split data flow back together so that it is whole when passed, via the VPN interface 514, to the operating system 512 and/or to applications 518 executing on the computing device 502. In various examples and depending on a type of operating system, the VPN interface may be referred to as an Internal Adapter, a Tunnel Interface, etc.

Some additional changes in the VPN gateway 108 can be implemented to accommodate two simultaneous VPN connections with a single VPN client 102. As described above with respect to FIGS. 1-5, multiple VPN server instances 110, 112 of the VPN gateway 108 are configured to use a static IP address 202 for the VPN client 102. Unfortunately, this can potentially create a problem with respect to reverse data flow traffic, or data being sent from an application executing in the network resources 114 (e.g., a virtual machine) to an application executing on the remote computing device 104.

Figure 6A:
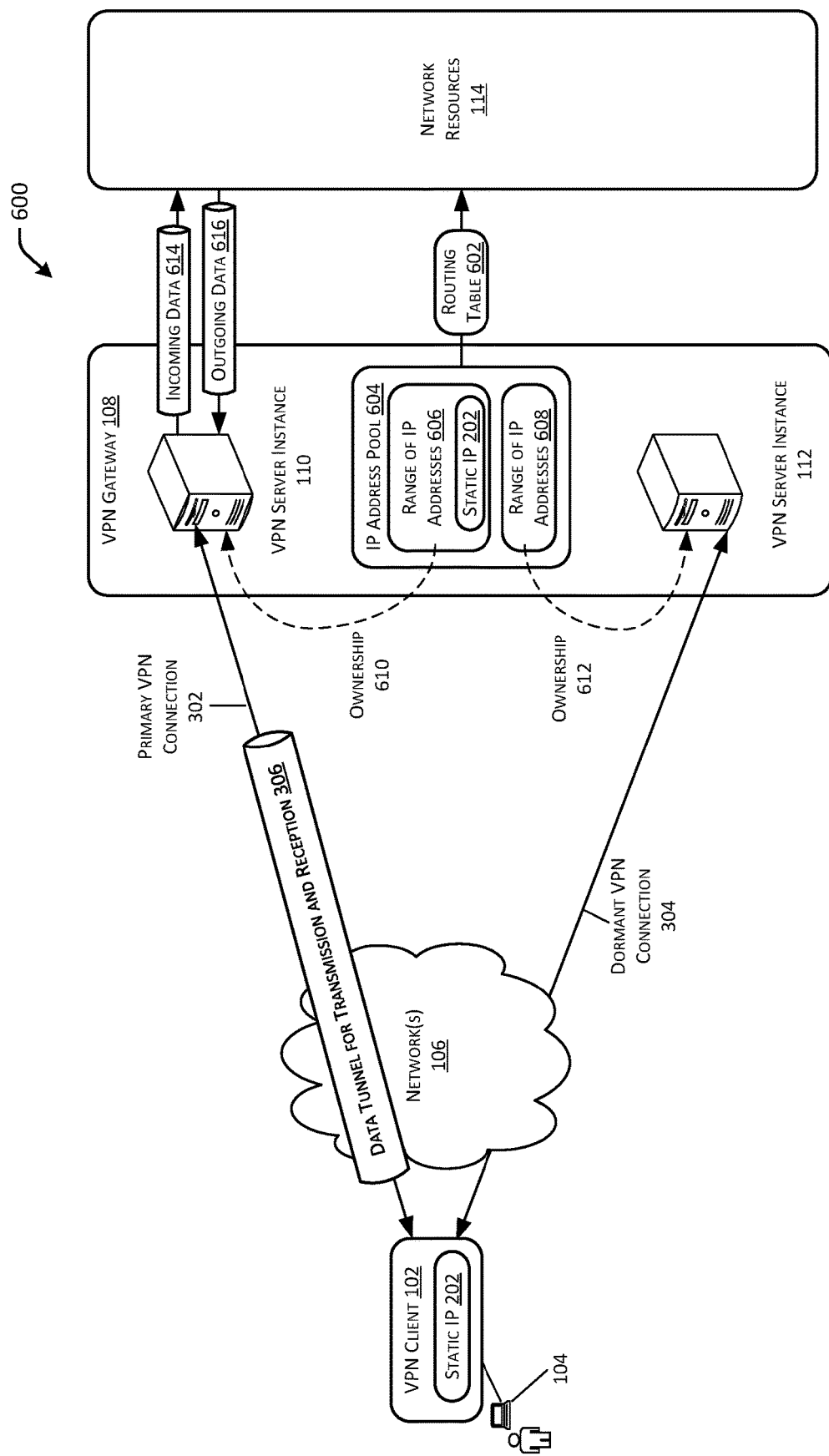
FIG. 6A illustrates an example environment in which a VPN gateway uses a routing table to ensure network resources route data traffic back to the VPN client through the correct VPN server instance.

FIG. 6A illustrates an example environment 600 in which a VPN gateway 108 uses a routing table 602 to ensure network resources 114 route data traffic back to the VPN client 102 through the correct VPN server instance. The routing table 602 is advertised to, and used by, the network resources 114 (e.g., virtual networks and/or virtual machines configured to execute an application in the cloud) that are configured behind the VPN gateway 108. The routing table 602 provides guidance with regard to how the network resources 114 are to route data being sent back to the VPN client 102.

The VPN gateway 108 is configured to allocate a pool of IP addresses 604 (e.g., 192.168.0.0/24) which are to be assigned by the VPN server instances 110, 112 to different VPN clients (e.g., VPN client 102 being one of these VPN clients). This pool of IP addresses 604 is divided amongst the VPN server instances 110, 112 in the VPN gateway 108. Consequently, the first VPN server instance 110 has a first range of IP addresses 606 (e.g., 192.168.0.0/25) from the pool 604, which are intended to be assigned to VPN clients with which the first VPN server instance 110 establishes VPN connections. Similarly, the second VPN server instance 112 has a second range of IP addresses 608 (e.g., 192.168.0.128.0/25) from the pool 604, which does not overlap with the first range of IP addresses 606, and which are intended to be assigned to VPN clients with which the second VPN server instance 112 establishes VPN connections.

The allocation of a range of IP addresses from the pool may be referred to as ownership, e.g., a VPN server instance claims ownership of the range of IP addresses. Accordingly, FIG. 6A shows that the first VPN server instance stakes an ownership 610 claim on the first range of IP addresses 606, and that the second VPN server instance 112 stakes an ownership 612 claim on the second range of IP addresses 608.

This pool division, or the IP address ranges 606, 608 owned by the different VPN server instances 110, 112, is reflected in the routing table 602 that is advertised to the network resources 114. In this way, the network resources 114 know which VPN server instance 110, 112 to send back data to the VPN client 102 using this routing table 602. Since there is no overlap in the ranges of IP addresses, the network resources 114 are configured, via the use of the routing table 602, to only respond to one VPN server instance at a given time.

In various examples, the routing table 602 associates different IP addresses in a particular range with an IP address that corresponds to a VPN server instance. In this way, the network resources 114 are made aware of an VPN server instance that is included as a hop when returning data to the VPN client 102.

As described above with respect to FIGS. 1-5, two different VPN server instances 110, 112 are using the same static IP address 202 to establish two different VPN connections with a single VPN client 102. This static IP address 202 is assigned to the VPN client 102 by the first VPN server instance 110, as described above with respect to FIG. 2. Accordingly, the first VPN server instance 110 selects the static IP address 202 out of the range of IP addresses 606 it owns. Consequently, in this scenario, the routing table 602 essentially instructs the network resources 114 to send data back to the VPN client 102 through the first VPN server instance 110. This instruction is correct and appropriate as long as the first VPN server instance 110 has not experienced an interruption. That is, data 614 that is incoming to the network resources 114 is processed through the first VPN server instance 110 and data 616 that is outgoing from the network resources 114 is also processed, in return, through the first VPN server instance 110.

Figure 6B:
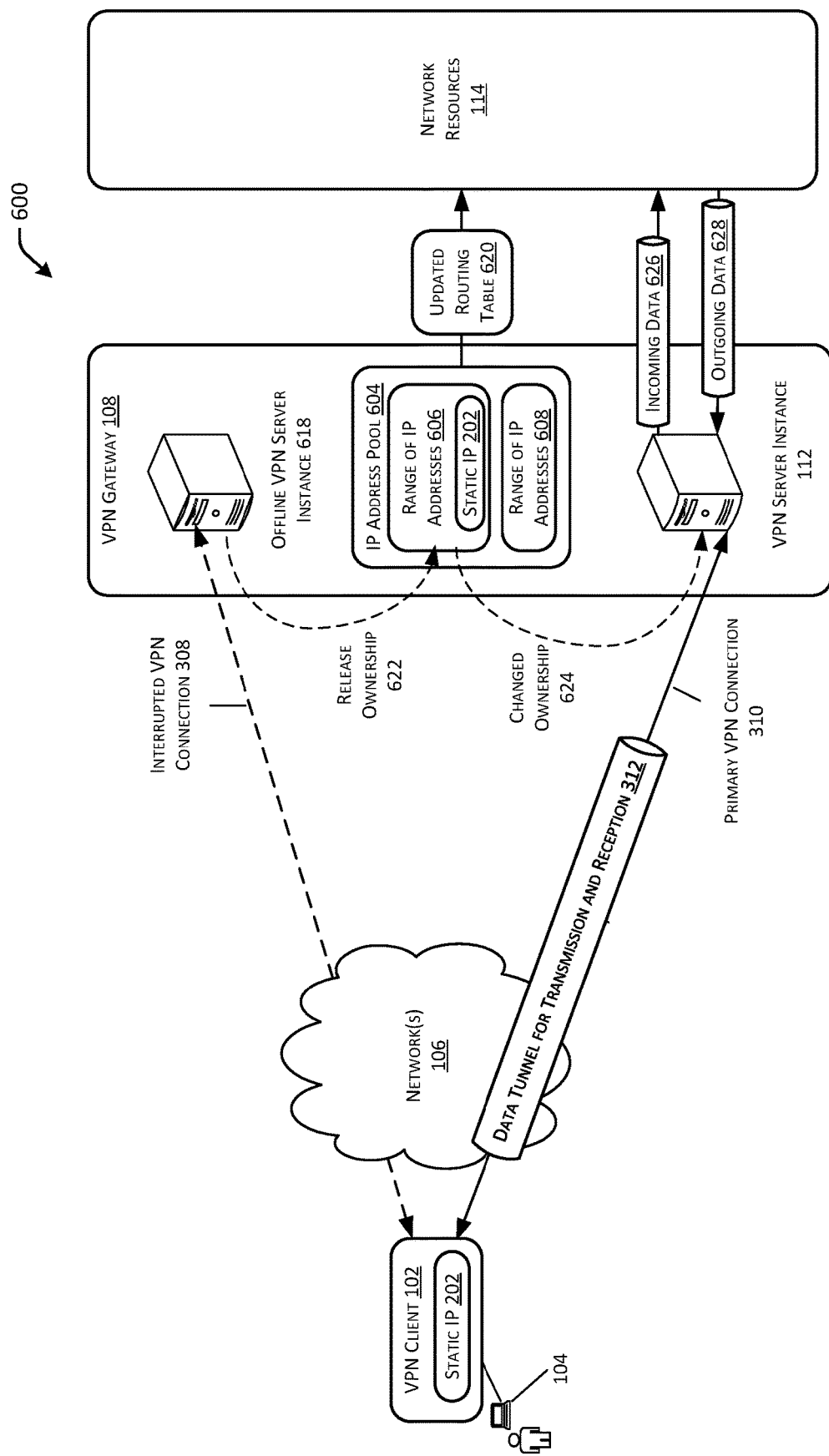
FIG. 6B illustrates an example environment in which a VPN gateway uses an updated routing table to ensure network resources route data traffic back to the VPN client through the correct VPN server instance in a situation where a VPN server instance is unavailable.

However, a problem may occur when the first VPN connection 120 between the VPN client 102 and the first VPN server instance 110 is interrupted and the second VPN connection 130 between the VPN client 102 and the second VPN server instance 112 is used. In one example, the first VPN connection 120 may be interrupted 308 if the first VPN server instance 110 fails and/or is taken offline 618, as shown in FIG. 6B. In this scenario, the old routing table 602 from FIG. 6A indicates that the static IP address 202 for the VPN client 102 is included in the first range of IP addresses 606, which is owned by the offline VPN server instance 618. Accordingly, the network resources 114 are still configured to send data back to a VPN server instance that is not operational or is unavailable. This data response may occur even though the incoming data is received by the network resources 114 via the second VPN server instance 112.

To implement proper data flows, and particularly the data that flows in the reverse direction (e.g., cloud to client), the VPN gateway 108 is configured to update the routing table 620 when a VPN server instance fails and/or is taken offline 618. When the first VPN server instance fails and/or is taken offline 618, the first VPN server instance 618 releases, as part of a failover process, its claim of ownership 622 on its range of IP addresses 606. In various examples, as an additional part of this failover process, the first VPN server instance 618 requests that the second VPN server instance 112 take over ownership of the range of IP addresses 606. This take over is implemented for routing purposes, but not for client IP address allocation purposes.

After this release occurs, the second VPN server instance 112 is configured to claim ownership of the range of IP addresses 606 that used to be owned by the first VPN server instance, as referred to as a changed ownership 624. This updated claim of ownership is captured in the updated routing table 620 that is advertised to the network resources 114. Consequently, the network resources 114 use this updated routing table 620 to correctly determine that the reverse data flow, for the static IP address 202 originally allocated via the first VPN server instance 110, should currently be sent back to the VPN client 102 through the second VPN server instance 112, at least for a temporary period of time while the first VPN server instance is unavailable. That is, data 626 that is incoming to the network resources 114 during this period of time when the first VPN server instance is offline 618 is processed through the second VPN server instance 112 and data 628 that is outgoing from the network resources 114 is also processed, in return, through the second VPN server instance 112.

Figure 6C:
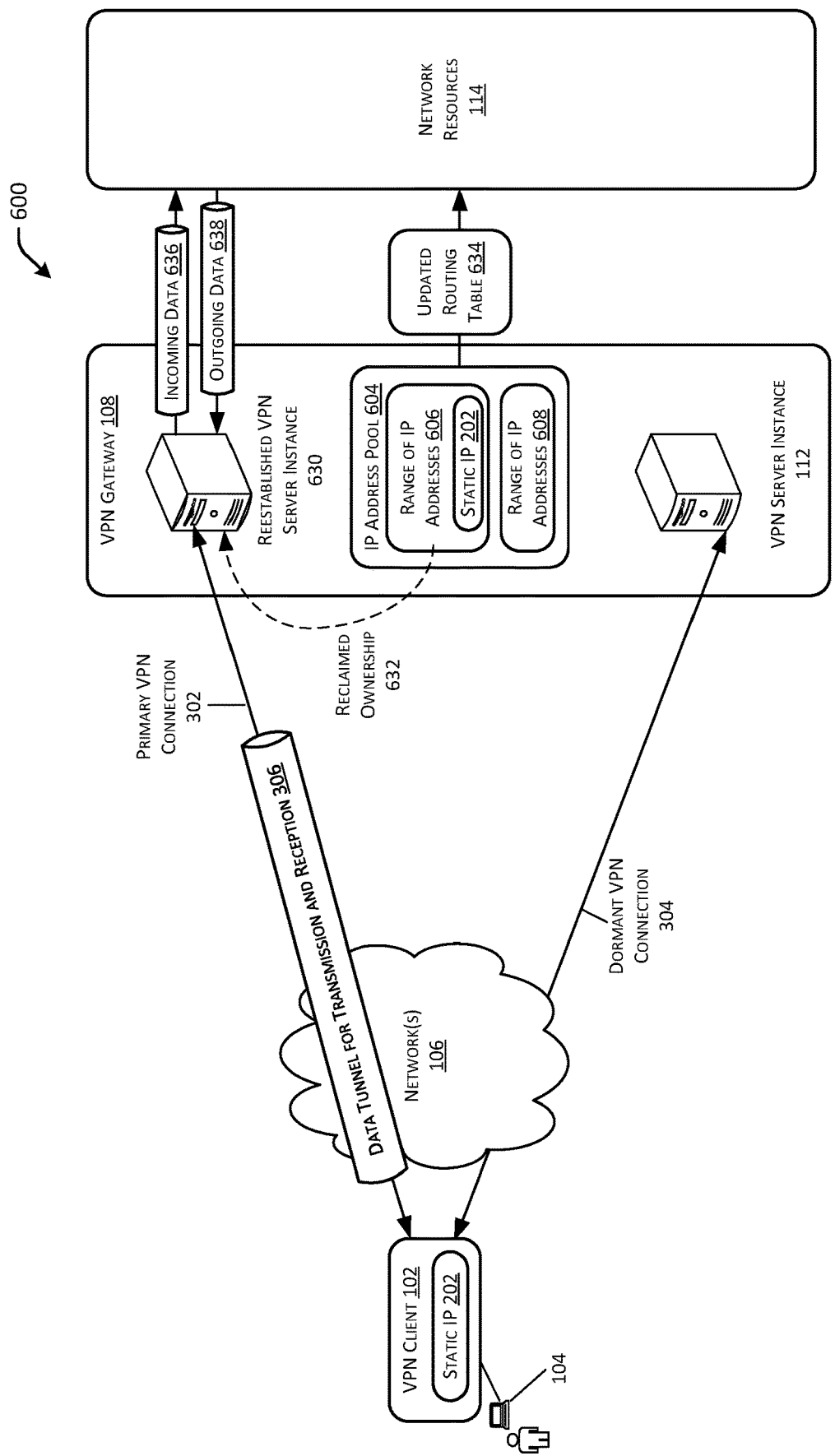
FIG. 6C illustrates another example environment in which a VPN gateway uses an updated routing table to ensure network resources route data traffic back to the VPN client through the correct VPN server instance in a situation where a VPN server instance that was previously unavailable comes back online.

FIG. 6C illustrates a situation where the first VPN server instance has been reestablished and is back online 630, after a time period when it is offline and unavailable. Accordingly, the first VPN server instance 630 can reclaim its ownership 632 of the range of IP addresses 606 and the routing table 634 is updated again to reflect this reclaimed ownership 632. That is, normal behavior is restored after the interruption and data 636 that is incoming to the network resources 114 is again processed through the first VPN server instance 630 and data 638 that is outgoing from the network resources 114 is again processed, in return, through the first VPN server instance 630.

Figure 7:
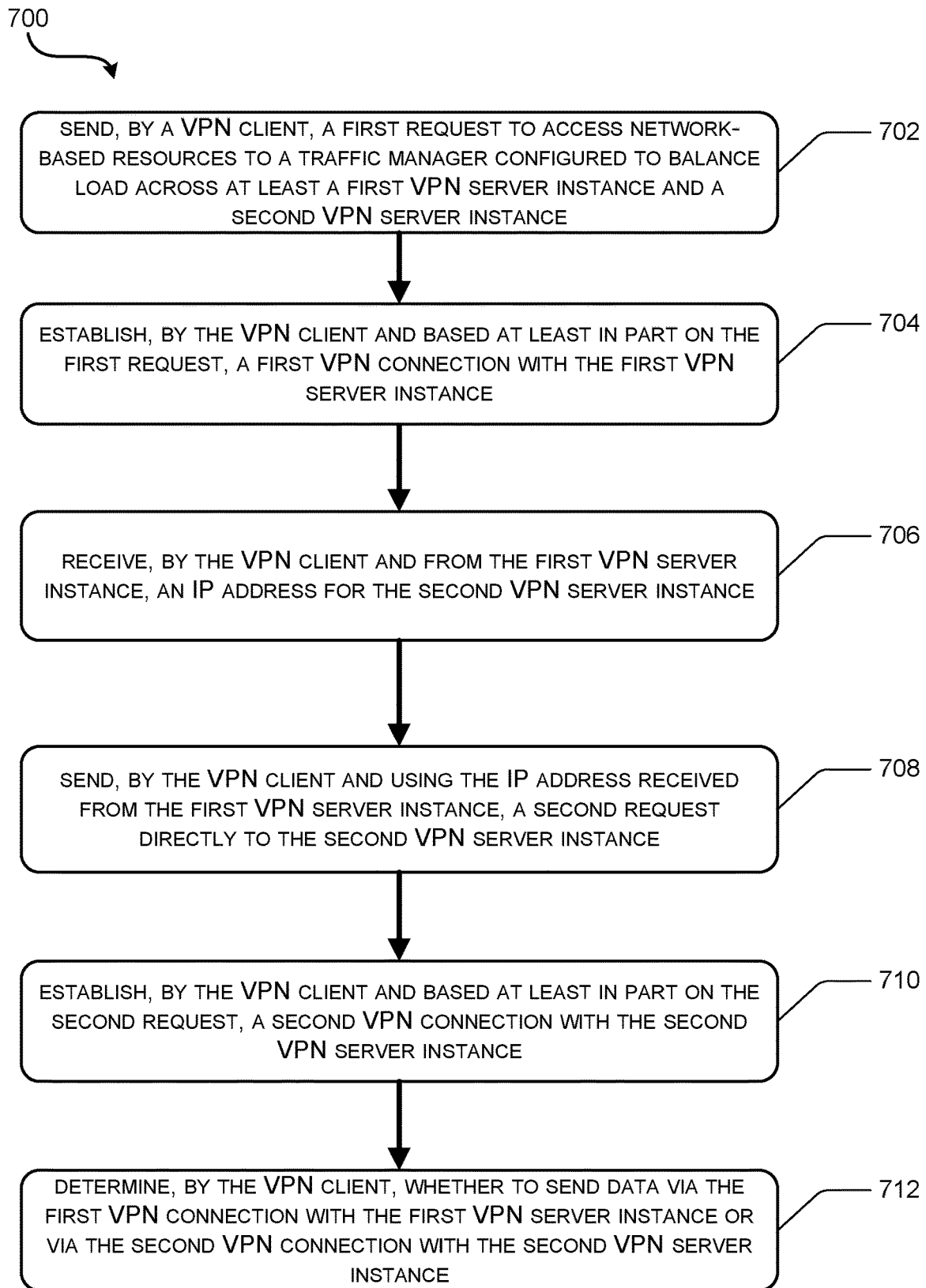
FIG. 7 is a flow diagram illustrating aspects of a sample routine that allows for a VPN client operating on a remote computing device to establish two VPN connections, over various network(s), with a VPN gateway.
Figure 8:
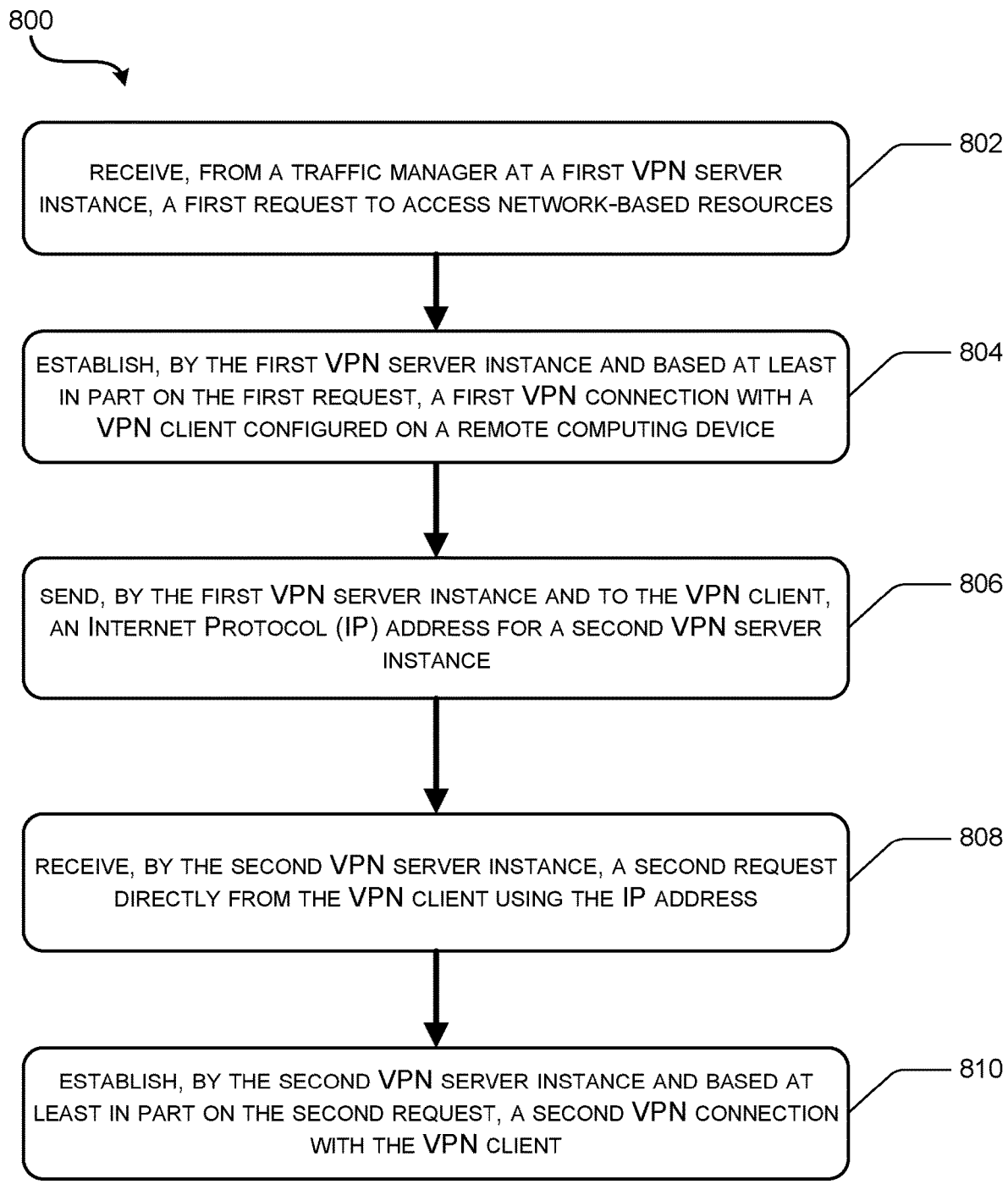
FIG. 8 is a flow diagram illustrating aspects of a sample routine that allows for a VPN gateway to establish two VPN connections, over various network(s), with a VPN client operating on a remote computing device.
Figure 9:
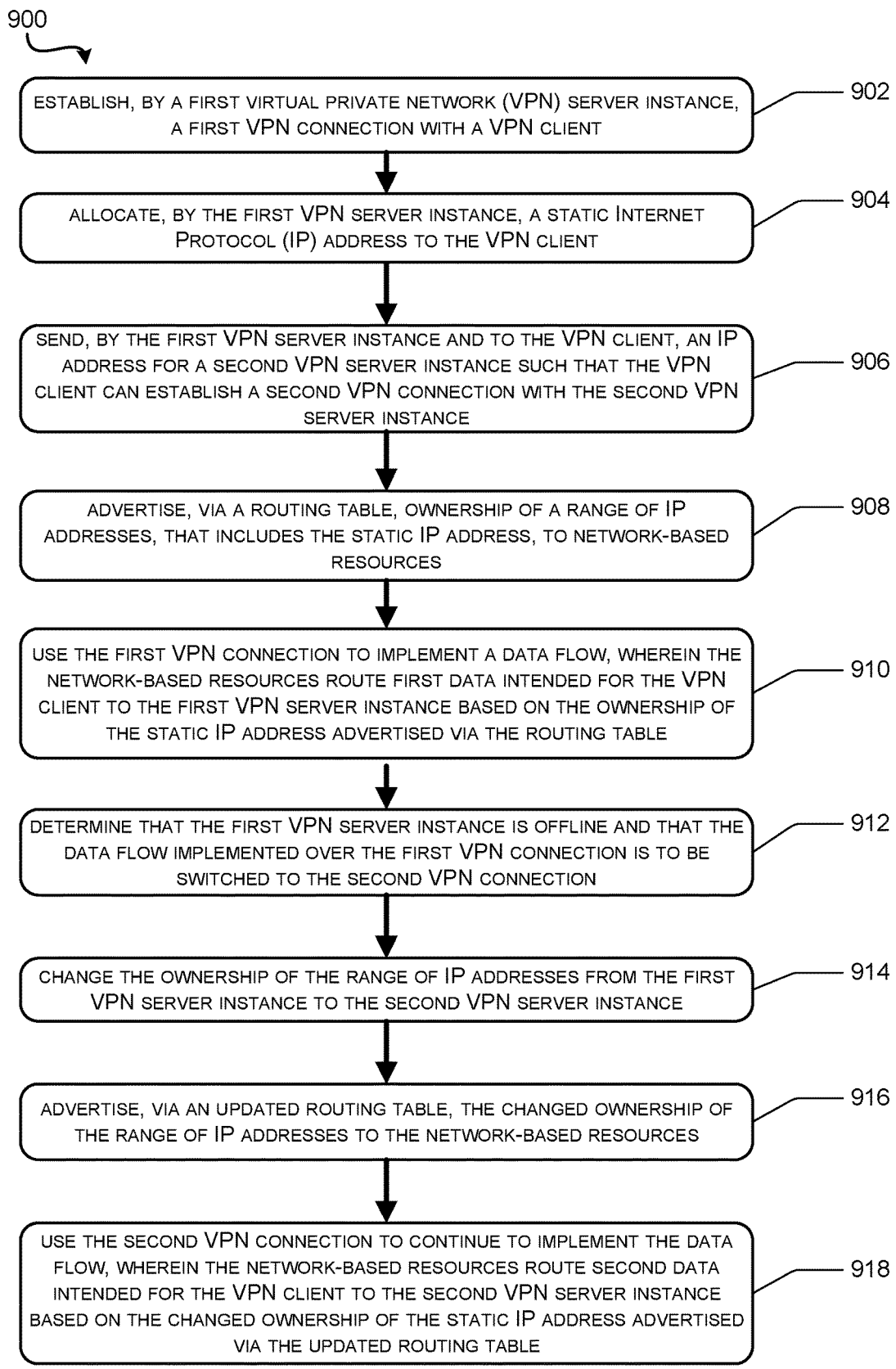
FIG. 9 is a flow diagram illustrating aspects of a sample routine that updates routing tables to ensure that data to be transmitted from network-based resources to a VPN client is routed through the correct VPN server instance of the VPN gateway.

FIGS. 7-9 are flow diagrams illustrating routines describing aspects of the present disclosure. In various examples, operations of the routines can be performed by the VPN client operating on a remote computing device. In other examples, operations of the routines can be performed by the VPN gateway 108. The logical operations described herein with regards to FIGS. 7-9 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 7, the routine 700 begins at operation 702 where a first request is sent, by a VPN client operating on a computing device, to a traffic manager configured to balance load across at least a first VPN server instance and a second VPN server instance. At operation 704, a first VPN connection is established by the VPN client with the first VPN server instance based at least in part on the first request, a first VPN connection with the first VPN server instance.

At operation 706, an IP address for the second VPN server instance is received by the VPN client and from the first VPN server instance. At operation 708, the VPN client uses the IP address received from the first VPN server instance to send a second request directly to the second VPN server instance.

At operation 710, the VPN client establishes a second VPN connection with the second VPN server instance based at least in part on the second request. At operation 712, the VPN client determines whether to send data via the first VPN connection with the first VPN server instance or via the second VPN connection with the second VPN server instance. For example, the determination can be made in accordance with the discussion above with regard to FIGS. 3A-3B or FIG. 4.

With reference to FIG. 8, the routine 800 begins at operation 802 where a first VPN server instance receives, from a traffic manager, a first request to access network-based resources. At operation 804, the first VPN server instance establishes, based at least in part on the first request, a first VPN connection with a VPN client configured on a remote computing device.

At operation 806, the first VPN server instance sends, to the VPN client, an Internet Protocol (IP) address for a second VPN server instance. At operation 808, the second VPN server instance receives a second request directly from the VPN client using the IP address. Finally, at operation 810, the second VPN server instance establishes, based at least in part on the second request, a second VPN connection with the VPN client. Accordingly, the first and second VPN connection can be used to transmit data in accordance with one of the examples described above with respect to FIGS. 3A-3B or FIG. 4.

With reference to FIG. 9, the routine 900 begins at operation 902 where a first virtual private network (VPN) server instance establishes a first VPN connection with a VPN client. At operation 904, the first VPN server instance allocates a static Internet Protocol (IP) address to the VPN client. The static IP address is selected from a range of IP addresses owned by the first VPN server instance. At operation 906, the first VPN server instance sends, to the VPN client, an IP address for a second VPN server instance such that the VPN client can establish a second VPN connection with the second VPN server instance.

At operation 908, the VPN gateway advertises a routing table, via a routing table, the ownership of the range of IP addresses to network-based resources configured behind the first VPN server instance and the second VPN server instance. At operation 910, the first VPN server instance uses the first VPN connection to implement a data flow between the VPN client and the network-based resources. To implement this data flow, the network-based resources route first data intended for the VPN client to the first VPN server instance using the ownership of the static IP address advertised via the routing table.

At operation 912, it is determined that the first VPN server instance is offline and that the data flow implemented over the first VPN connection is to be switched to the second VPN connection. At operation 914, the VPN gateway changes the ownership of the range of IP addresses from the first VPN server instance to the second VPN server instance. At operation 916, the VPN gateway advertises, via an updated routing table, the changed ownership of the range of IP addresses to the network-based resources.

Finally, at operation 918, the second VPN server instance uses the second VPN connection to continue to implement the data flow between the VPN client and the network-based resources. As part of this continued data flow, the network-based resources route second data intended for the VPN client to the second VPN server instance using the changed ownership of the static IP address advertised via the updated routing table.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 10:
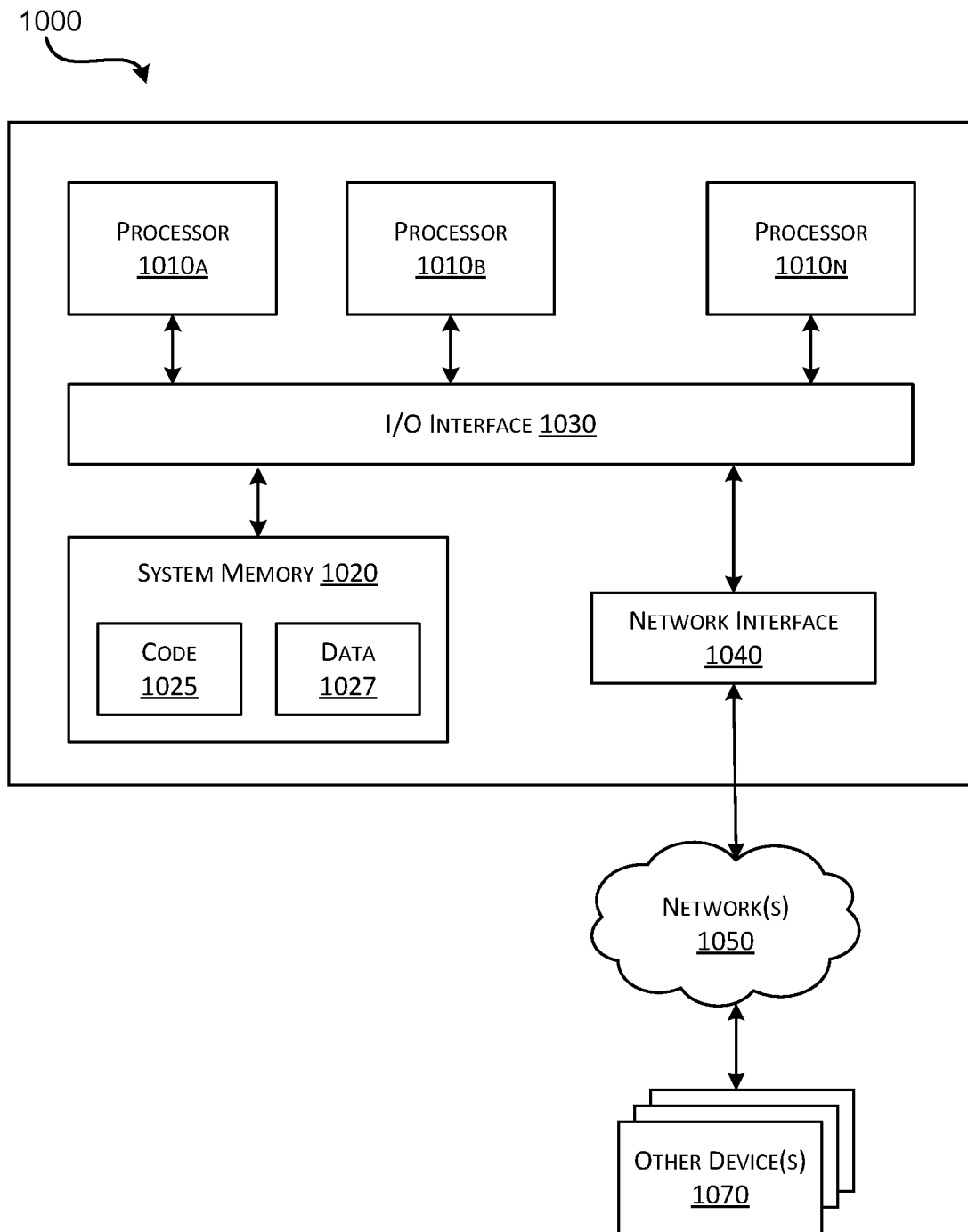
FIG. 10 is an example computing system capable of implementing the techniques of the present disclosure.

FIG. 10 illustrates a general-purpose computing device 1000. In various examples, device 1000 can be a desktop computer, a server computer, a game console and/or a gaming device, a tablet computer, a personal data assistant (PDA), a mobile phone/tablet hybrid, a laptop computer, a telecommunication device, a wearable device, a workstation, or any other sort of computing device. In the illustrated embodiment, computing device 1000 includes one or more processors 1010a, 1010b, and/or 1010n (which may be referred herein singularly as "a processor 1010" or in the plural as "the processors 1010") coupled to a system memory 1020 via an input/output (I/O) interface 1030. Computing device 1000 further includes a network interface 1040 coupled to the I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x77, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 1020 as code 1025 and data 1027.

In one embodiment, the I/O interface 1030 may be configured to coordinate I/O traffic between the processor 1010, system memory 1020, and any peripheral devices in the device, including network interface 1040 or other peripheral interfaces. In some embodiments, the I/O interface 1030 may perform any necessary protocol, timing, or other data transformations to convert data signals from one component (e.g., system memory 1020) into a format suitable for use by another component (e.g., processor 1010). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. Also, in some embodiments some or all of the functionality of the I/O interface 1030, such as an interface to system memory 1020, may be incorporated directly into processor 1010.

Network interface 1040 may be configured to allow data to be exchanged between computing device 1000 and other device or devices 1070 attached to a network or network(s) 1050, such as other computer systems or components illustrated in FIGS. 1 through 6C, for example. In various embodiments, network interface 1040 may support communication via any suitable wired or wireless general data networks. Additionally, network interface 1040 may support communication via telecommunications/telephony networks such as analog voice networks or digital fiber communications networks, via storage area networks such as Fibre Channel SANs or via any other suitable type of network and/or protocol.

Network(s) 1050 (e.g., networks 106) may include, for example, public networks such as the Internet, private networks such as an institutional and/or personal intranet, or some combination of private and public networks. Network(s) 1050 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 1050 may utilize communications protocols, including packet-based and/or datagram-based protocols such as Internet protocol ("IP"), transmission control protocol ("TCP"), user datagram protocol ("UDP"), or other types of protocols. Moreover, network(s) 1050 may also include a number of devices that facilitate network communications and/or form a hardware basis for the networks, such as switches, routers, gateways, access points, firewalls, base stations, repeaters, backbone devices, and the like.

In some embodiments, system memory 1020 may be one embodiment of a computer-accessible medium configured to store program instructions and data as described above for FIGS. 1-9. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals such as electrical, electromagnetic or digital signals, conveyed via a communication medium such as a network and/or a wireless link, such as may be implemented via network interface 1040.

Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 10, may include other components that are not explicitly shown in FIG. 10, or may utilize an architecture completely different than that shown in FIG. 10.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses.

Example Clause A, a method comprising: establishing, by a first virtual private network (VPN) server instance, a first VPN connection with a VPN client; allocating, by the first VPN server instance, a static Internet Protocol (IP) address to the VPN client, wherein the static IP address is selected from a range of IP addresses owned by the first VPN server instance; sending, by the first VPN server instance and to the VPN client, an IP address for a second VPN server instance such that the VPN client can establish a second VPN connection with the second VPN server instance; advertising, via a routing table, the ownership of the range of IP addresses to network-based resources configured behind the first VPN server instance and the second VPN server instance; using, by the first VPN server instance, the first VPN connection to implement a data flow between the VPN client and the network-based resources, wherein the network-based resources route first data intended for the VPN client to the first VPN server instance based on the ownership of the static IP address advertised via the routing table; determining that the first VPN server instance is offline and that the data flow implemented over the first VPN connection is to be switched to the second VPN connection; in response to determining that the first VPN server instance is offline and that the data flow implemented over the first VPN connection is to be switched to the second VPN connection, changing the ownership of the range of IP addresses from the first VPN server instance to the second VPN server instance; advertising, via an updated routing table, the changed ownership of the range of IP addresses to the network-based resources; and using, by the second VPN server instance, the second VPN connection to continue to implement the data flow between the VPN client and the network-based resources, wherein the network-based resources route second data intended for the VPN client to the second VPN server instance based on the changed ownership of the static IP address advertised via the updated routing table.

Example Clause B, the method of Example Clause A, further comprising: determining that the first VPN server instance is back online; in response to determining that the first VPN server instance is back online, changing the ownership of the range of IP addresses back to the first VPN server instance; advertising, via an additional updated routing table, the additional changed ownership of the range of IP addresses to the network-based resources; and using, by the first VPN server instance, the first VPN connection to continue to implement the data flow between the VPN client and the network-based resources, wherein the network-based resources route third data intended for the VPN client to the first VPN server instance based on the additional changed ownership of the static IP address advertised via the additional updated routing table.

Example Clause C, the method of Example Clause A or Example Clause B, wherein the range of IP addresses are allocated to the first VPN server instance from a pool of IP addresses divided amongst at least the first VPN server instance and the second VPN server instance.

Example Clause D, the method of any one of Example Clauses A through C, wherein changing the ownership of the range of IP addresses from the first VPN server instance to the second VPN server instance comprises the first VPN server instance releasing an ownership claim, as part of a failover process, and the second VPN server instance making an ownership claim, as part of the failover process.

Example Clause E, the method of any one of Example Clauses A through D, wherein the first VPN server instance and the second VPN server instance are part of a VPN gateway.

Example Clause F, the method of any one of Example Clauses A through E, wherein the network-based resources comprise at least one of a virtual network or a virtual machine within which an application is executing.

Example Clause G, a system comprising: one or more processing units; and computer storage media having executable instructions that, when executed by the one or more processing units, cause the system to perform operations comprising: advertising, via a routing table, ownership of a range of Internet Protocol (IP) addresses for a first virtual private network (VPN) server instance to network-based resources configured behind the first VPN server instance; determining that the first VPN server instance is offline and that a data flow implemented over a first VPN connection established by the first VPN server instance with a VPN client is to be switched to a second VPN connection established by a second VPN server instance with the VPN client, wherein the VPN client is assigned a static IP address from the range of IP addresses; in response to determining that the first VPN server instance is offline and that the data flow implemented over the first VPN connection is to be switched to the second VPN connection, advertising, via an updated routing table, changed ownership of the range of IP addresses for the second VPN server instance to the network-based resources; and using, by the second VPN server instance, the second VPN connection to implement the data flow between the VPN client and the network-based resources, wherein the network-based resources route data intended for the VPN client to the second VPN server instance based on the changed ownership of the static IP address advertised via the updated routing table.

Example Clause H, the system of Example Clause G, wherein the first VPN server instance assigns the static IP address to the VPN client during an IP allocation phase.

Example Clause I, the system of Example Clause G or Example Clause H, wherein the operations further comprise: determining that the first VPN server instance is back online; in response to determining that the first VPN server instance is back online, changing the ownership of the range of IP addresses back to the first VPN server instance; advertising, via an additional updated routing table, the additional changed ownership of the range of IP addresses to the network-based resources; and using, by the first VPN server instance, the first VPN connection to continue to implement the data flow between the VPN client and the network-based resources, wherein the network-based resources route third data intended for the VPN client to the first VPN server instance based on the additional changed ownership of the static IP address advertised via the additional updated routing table.

Example Clause J, the system of any one of Examples Clause G through I, wherein the range of IP addresses are allocated to the first VPN server instance from a pool of IP addresses divided amongst at least the first VPN server instance and the second VPN server instance.

Example Clause K, the system of any one of Examples Clause G through J, wherein changing the ownership of the range of IP addresses from the first VPN server instance to the second VPN server instance comprises the first VPN server instance releasing an ownership claim, as part of a failover process, and the second VPN server instance making an ownership claim, as part of the failover process.

Example Clause L, the system of any one of Examples Clause G through K, wherein the first VPN server instance and the second VPN server instance are part of a VPN gateway.

Example Clause M, the system of any one of Examples Clause G through L, wherein the network-based resources comprise at least one of a virtual network or a virtual machine within which an application is executing.

Example Clause N, a system comprising: one or more processing units; and computer storage media having executable instructions that, when executed by the one or more processing units, cause the system to perform operations comprising: receiving, from a traffic manager at a first virtual private network (VPN) server instance, a first request to access network-based resources; establishing, by the first VPN server instance and based at least in part on the first request, a first VPN connection with a VPN client configured on a remote computing device; sending, by the first VPN server instance and to the VPN client, an Internet Protocol (IP) address for a second VPN server instance; receiving, by the second VPN server instance, a second request directly from the VPN client using the IP address; and establishing, by the second VPN server instance and based at least in part on the second request, a second VPN connection with the VPN client.

Example Clause O, the system of Examples Clause N, wherein the operations further comprise designating, based on a policy, the first VPN connection as a primary VPN connection and the second VPN connection as a dormant VPN connection to be used when an interruption is experienced on the primary VPN connection.

Example Clause P, the system of Examples Clause N or Example Clause O, wherein the operations further comprise sending, by the first VPN server instance, a static IP address allocated to the VPN client along with instructions for the VPN client to request that the second VPN server instance use the static IP address to establish the second VPN connection.

Example Clause Q, the system of Examples Clause P, wherein the static IP address is selected from a range of IP addresses available to the first VPN server instance for assignment to VPN clients.

Example Clause R, the system of Examples Clause R, wherein the operations further comprise advertising ownership of the range of the IP addresses on behalf of the first VPN server instance to the network-based resources.

Example Clause S, the system of Examples Clause N, wherein the operations further comprise: monitoring performance parameters associated with the first VPN connection and the second VPN connection; and determining that the performance parameters indicate that one of the first VPN connection or the second VPN connection performs better than the other of the first VPN connection or the second VPN connection; and sending data via the one of the first VPN connection or the second VPN connection that is currently performing better than the other of the first VPN connection or the second VPN connection.

Example Clause T, the system of Examples Clause S, wherein the performance parameters comprise latency.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different connections, two different server instances, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    establishing, by a first virtual private network (VPN) server instance, a first VPN connection with a VPN client;
    allocating, by the first VPN server instance, a static Internet Protocol (IP) address to the VPN client, wherein the static IP address is selected from a range of IP addresses owned by the first VPN server instance;
    sending, by the first VPN server instance and to the VPN client, an IP address for a second VPN server instance such that the VPN client can establish a second VPN connection with the second VPN server instance;
    advertising, via a routing table, the ownership of the range of IP addresses to network-based resources configured behind the first VPN server instance and the second VPN server instance;
    using, by the first VPN server instance, the first VPN connection to implement a data flow between the VPN client and the network-based resources, wherein the network-based resources route first data intended for the VPN client to the first VPN server instance based on the ownership of the static IP address advertised via the routing table;
    determining that the first VPN server instance is offline and that the data flow implemented over the first VPN connection is to be switched to the second VPN connection;
    in response to determining that the first VPN server instance is offline and that the data flow implemented over the first VPN connection is to be switched to the second VPN connection, changing the ownership of the range of IP addresses from the first VPN server instance to the second VPN server instance;
    advertising, via an updated routing table, the changed ownership of the range of IP addresses to the network-based resources; and
    using, by the second VPN server instance, the second VPN connection to continue to implement the data flow between the VPN client and the network-based resources, wherein the network-based resources route second data intended for the VPN client to the second VPN server instance based on the changed ownership of the static IP address advertised via the updated routing table.

2. The method of claim 1, further comprising:
    determining that the first VPN server instance is back online;
    in response to determining that the first VPN server instance is back online, changing the ownership of the range of IP addresses back to the first VPN server instance;
    advertising, via an additional updated routing table, the additional changed ownership of the range of IP addresses to the network-based resources; and
    using, by the first VPN server instance, the first VPN connection to continue to implement the data flow between the VPN client and the network-based resources, wherein the network-based resources route third data intended for the VPN client to the first VPN server instance based on the additional changed ownership of the static IP address advertised via the additional updated routing table.

3. The method of claim 1, wherein the range of IP addresses are allocated to the first VPN server instance from a pool of IP addresses divided amongst at least the first VPN server instance and the second VPN server instance.

4. The method of claim 1, wherein changing the ownership of the range of IP addresses from the first VPN server instance to the second VPN server instance comprises the first VPN server instance releasing an ownership claim, as part of a failover process, and the second VPN server instance making an ownership claim, as part of the failover process.

5. The method of claim 1, wherein the first VPN server instance and the second VPN server instance are part of a VPN gateway.

6. The method of claim 1, wherein the network-based resources comprise at least one of a virtual network or a virtual machine within which an application is executing.

7. A system comprising:
    one or more processing units; and
    computer storage media having executable instructions that, when executed by the one or more processing units, cause the system to perform operations comprising:
        advertising, via a routing table, ownership of a range of Internet Protocol (IP) addresses for a first virtual private network (VPN) server instance to network-based resources configured behind the first VPN server instance;

determining that the first VPN server instance is offline and that a data flow implemented over a first VPN connection established by the first VPN server instance with a VPN client is to be switched to a second VPN connection established by a second VPN server instance with the VPN client, wherein the VPN client is assigned a static IP address from the range of IP addresses;

in response to determining that the first VPN server instance is offline and that the data flow implemented over the first VPN connection is to be switched to the second VPN connection, advertising, via an updated routing table, changed ownership of the range of IP addresses for the second VPN server instance to the network-based resources; and using, by the second VPN server instance, the second VPN connection to implement the data flow between the VPN client and the network-based resources, wherein the network-based resources route data intended for the VPN client to the second VPN server instance based on the changed ownership of the static IP address advertised via the updated routing table.

8. The system of claim 7, wherein the first VPN server instance assigns the static IP address to the VPN client during an IP allocation phase.

9. The system of claim 7, wherein the operations further comprise:

determining that the first VPN server instance is back online;

in response to determining that the first VPN server instance is back online, changing the ownership of the range of IP addresses back to the first VPN server instance;

advertising, via an additional updated routing table, the additional changed ownership of the range of IP addresses to the network-based resources; and using, by the first VPN server instance, the first VPN connection to continue to implement the data flow between the VPN client and the network-based resources, wherein the network-based resources route third data intended for the VPN client to the first VPN server instance based on the additional changed ownership of the static IP address advertised via the additional updated routing table.

10. The system of claim 7, wherein the range of IP addresses are allocated to the first VPN server instance from a pool of IP addresses divided amongst at least the first VPN server instance and the second VPN server instance.

11. The system of claim 7, wherein changing the ownership of the range of IP addresses from the first VPN server instance to the second VPN server instance comprises the first VPN server instance releasing an ownership claim, as part of a failover process, and the second VPN server instance making an ownership claim, as part of the failover process.

12. The system of claim 7, wherein the first VPN server instance and the second VPN server instance are part of a VPN gateway.

13. The system of claim 7, wherein the network-based resources comprise at least one of a virtual network or a virtual machine within which an application is executing.

14. A system comprising:

one or more processing units; and computer storage media having executable instructions that, when executed by the one or more processing units, cause the system to perform operations comprising:

receiving, from a traffic manager at a first virtual private network (VPN) server instance, a first request to access network-based resources;

establishing, by the first VPN server instance and based at least in part on the first request, a first VPN connection with a VPN client configured on a remote computing device;

sending, by the first VPN server instance and to the VPN client, an Internet Protocol (IP) address for a second VPN server instance;

sending, by the first VPN server instance, a static IP address allocated to the VPN client along with instructions for the VPN client to request that the second VPN server instance use the static IP address to establish a second VPN connection;

receiving, by the second VPN server instance, a second request directly from the VPN client using the IP address; and establishing, by the second VPN server instance and based at least in part on the second request and the static IP address, the second VPN connection with the VPN client.

15. The system of claim 14, wherein the operations further comprise designating, based on a policy, the first VPN connection as a primary VPN connection and the second VPN connection as a dormant VPN connection to be used when an interruption is experienced on the primary VPN connection.

16. The system of claim 14, wherein the static IP address is selected from a range of IP addresses available to the first VPN server instance for assignment to VPN clients.

17. The system of claim 16, wherein the operations further comprise advertising ownership of the range of the IP addresses on behalf of the first VPN server instance to the network-based resources.

18. The system of claim 14, wherein the operations further comprise:

monitoring performance parameters associated with the first VPN connection and the second VPN connection; and determining that the performance parameters indicate that one of the first VPN connection or the second VPN connection performs better than the other of the first VPN connection or the second VPN connection; and sending data via the one of the first VPN connection or the second VPN connection that is currently performing better than the other of the first VPN connection or the second VPN connection.

19. The system of claim 18, wherein the performance parameters comprise latency.

* * * * *